Dec. 11, 1951 — E. M. DETERS — 2,578,050
AUTOMATIC AIR VOLUME CONTROL FOR
LIQUID SUPPLY SYSTEMS
Filed May 6, 1946

INVENTOR.
Elmer M. Deters
BY
McCanna and Morsbach
ATTORNEYS

Dec. 11, 1951  
E. M. DETERS  
2,578,050  
AUTOMATIC AIR VOLUME CONTROL FOR  
LIQUID SUPPLY SYSTEMS  
Filed May 6, 1946  
3 Sheets-Sheet 2
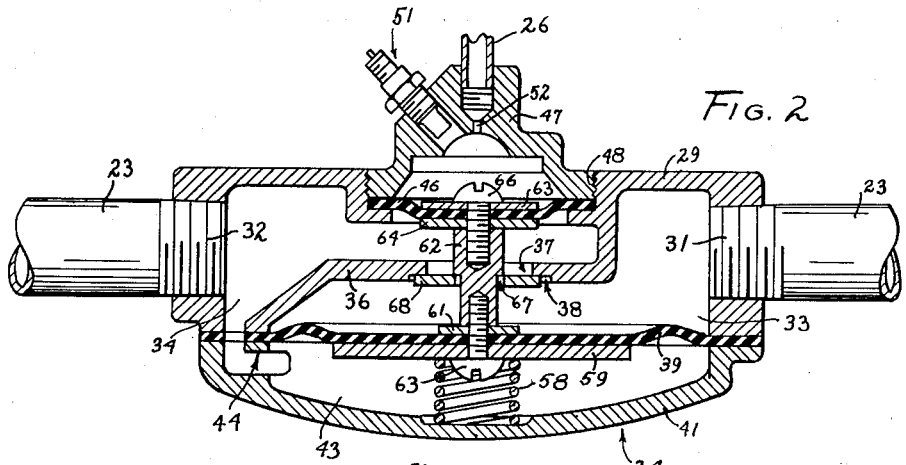
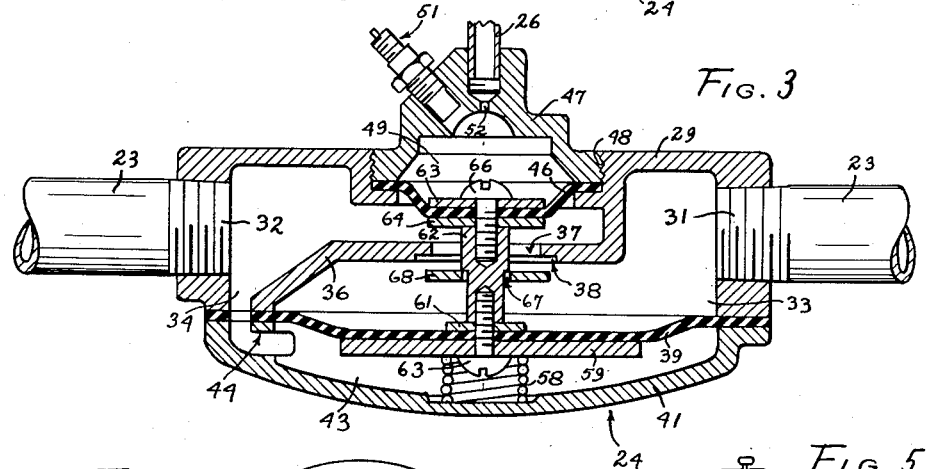
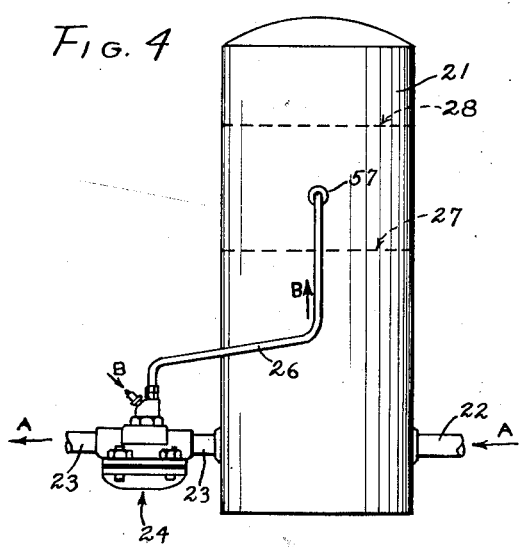
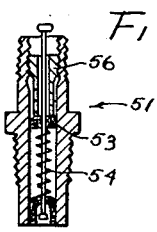
INVENTOR.
Elmer M. Deters
BY McCanna and Morsbach
ATTORNEYS Dec. 11, 1951           E. M. DETERS           2,578,050
AUTOMATIC AIR VOLUME CONTROL FOR
LIQUID SUPPLY SYSTEMS
Filed May 6, 1946                                             3 Sheets-Sheet 3
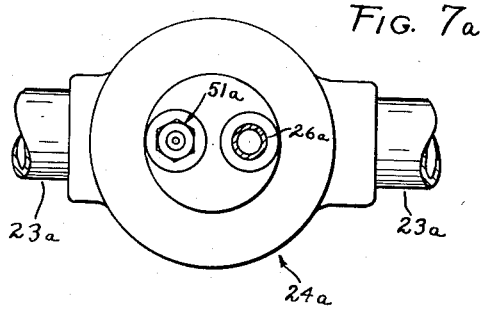
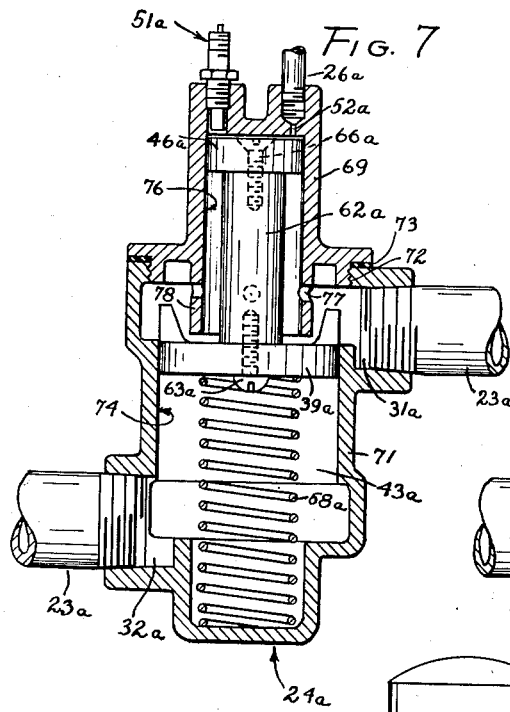 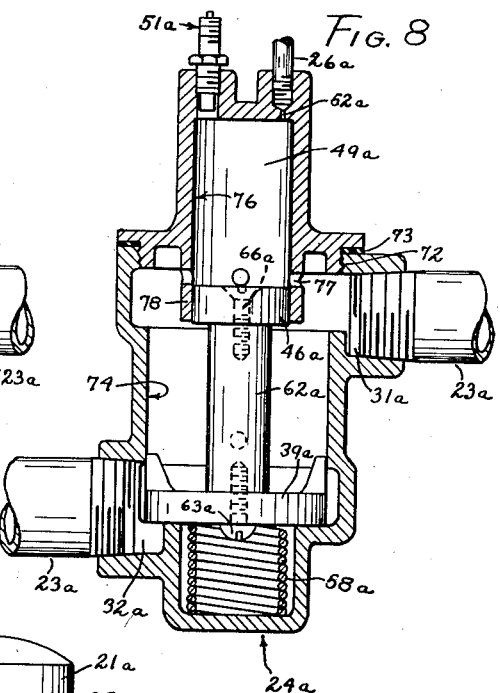
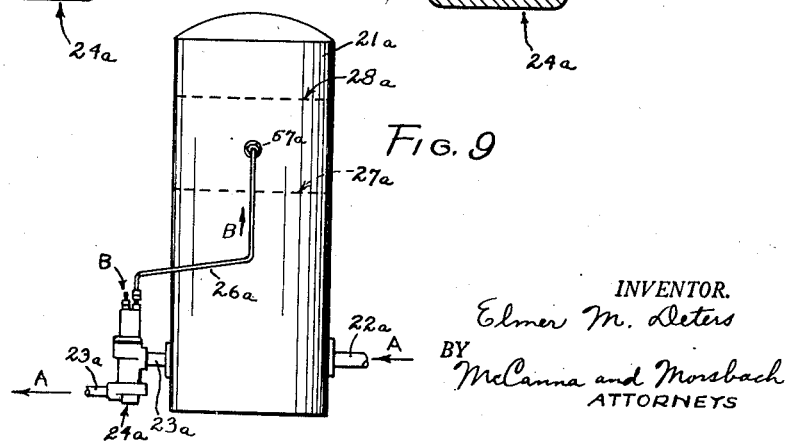
INVENTOR.
Elmer M. Deters
BY McCanna and Morsbach
ATTORNEYS Patented Dec. 11, 1951

2,578,050

UNITED STATES PATENT OFFICE 2,578,050

AUTOMATIC AIR VOLUME CONTROL FOR LIQUID SUPPLY SYSTEMS

Elmer M. Deters, Davenport, Iowa, assignor to Red Jacket Manufacturing Co., Davenport, Iowa, a corporation of Iowa Application May 6, 1946, Serial No. 667,713

3 Claims. (Cl. 222—401)

This invention relates to an automatic air volume control for a liquid pumping system and has particular reference to improvements in air pumps or air replenishing devices for automatically maintaining the required air volume in the storage tank of a water supply system.

The conventional water pumping system has a pump for pumping water from a well, or other source, into a pressure storage tank. The pressure tank is connected to suitable points of use, as in the usual plumbing system, whereby water is made available at a particular part of the system merely by opening a faucet. The pump is responsive to pressure changes in the tank to refill it each time the pressure drops to a certain minimum. A quantity of air will be maintained in the top of the storage tank so that a considerable amount of water can be drawn from the tank between pump operations to minimize starting and stopping of the pump. For example, the usual domestic water system will operate between 40 and 20 lbs. per square inch. That is, the pump will fill the storage tank to a level where the water and air are compressed to 40 lbs. per square inch when a pressure responsive switch will be operated to shut off the pump. As water is withdrawn, the tank pressure will drop until at 20 lbs. per square inch the pressure switch starts the pump to refill to the 40 lbs. pressure level. Since air, particularly under pressure, will be obsorbed in water, some means must be provided to replenish the air removed by the fresh water continuously passing through the tank; otherwise, as water passes through the high and low water levels would steadily rise as the air is used up and the pump would have to operate at increasingly short intervals until the air cushion would be all gone to completely waterlog the system and cause the pump to run continuously to maintain the pressure. The means usually provided to replenish the air has been a valve or device called an "air pump" installed on one side or the other of the water pump and which is operative each time the water pump is started to charge the tank with a certain quantity of air. An objectionable feature of this conventional air replenishing means is that since it pumps a certain quantity of air only once during each water pumping cycle every different sized storage tank requires a different sized air pump.

In contrast with the conventional air replenishing system, my invention contemplates the provision of an air pump which can be incorporated in the service line, leading from the tank and which can be made operative to charge the tank with air each time a faucet is opened, which will be many times more often than the times the water pump is started. Thus, since the volume of replenishing air moved by my air pump is proportional to the times water is withdrawn (which is proportional to the size of storage tank installed in the first place), the amount of air which can be charged into the tank during each water pump cycle will be approximately proportional to the size of the storage tank. Therefore, an important advantage of my invention is that it can be made in a single size that can be used with all sizes of storage tanks.

Broadly, it is the purpose of my invention to provide, in the service line leading from the storage tank, an air pump having an expandable and contractible suction chamber. The chamber will be connected to the storage tank through a line containing the usual restricted orifice, which is too small for the passage of water but large enough for the passage of air, and will also be provided with the usual "sniffer" or check valve for the inspiration of atmospheric air. The chamber will be expandable to inspire air each time water is caused to flow through the service line and it will be contractible to displace the inspired air into the tank when the flow to service is stopped.

Other objects and advantages will become apparent from the following description in connection with the drawings in which—

Figs. 2 and 3 are views similar to Figure 1 showing the parts in intermediate and wide open positions, respectively;

Fig. 4 is a partial view of a water pumping system showing the device installed in the line leading to service;

Fig. 5 is a sectional view of the "sniffer" or check valve shown in the previous figures;

Fig. 7 is a side sectional view similar to Figure 1 of another modification of my invention showing how the diaphragms of Figure 1 may be replaced by pistons and with the parts illustrated in the position they would normally assume when there is no flow through the device;

Fig. 7a is a top outside view of Fig. 7;

Fig. 8 is a view similar to Fig. 7 but showing the parts in the wide open position which they would assume when liquid is passing through the device, and Fig. 9 is a view similar to Fig. 4 showing how the Fig. 7 modification would be incorporated in the service line of a water pumping system.

Figure 1A:
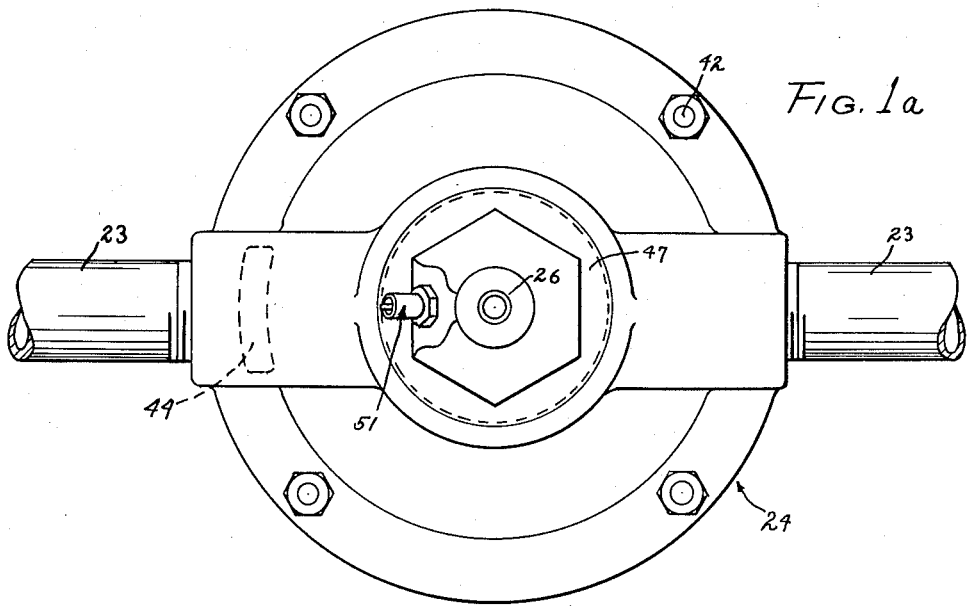
Fig. 1a is a top outside view of Figure 1.

Referring first to Fig. 4 of the drawings, the numeral 21 designates a pressure tank which is supplied by water through a pipe 22 leading from a water pump (not shown) and which supplies water to any designated number of outlets through a service pipe 23. In the service pipe 23 is an air pump or air replenishing device generally designated 24 illustrating one modification of my invention. It is connected through a tube 26 into the tank 21 intermediate the high and low water lines 27 and 28. This is in contrast to the conventional practice already referred to of placing the air pump in the tank supply line which in this case has been designated by the numeral 22. The arrows A indicate the flow of water and the arrows B indicate the flow of replenishing air from the atmosphere.

Figure 1:
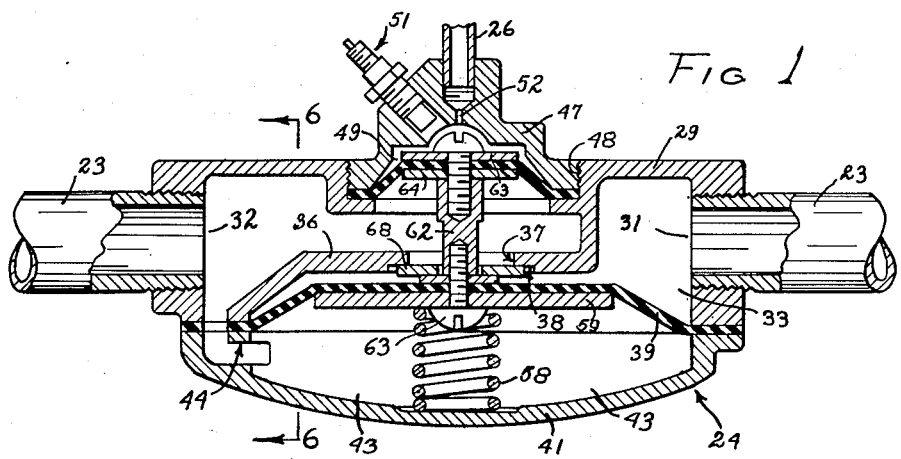
Figure 1 is a sectional side view of a diaphragm type air pump illustrating one modification of my invention and showing the parts in the position that they would normally assume when there is no flow through the air pump.
Figure 6:
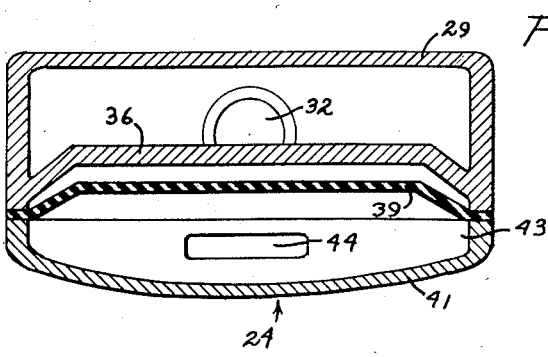
Fig. 6 is a sectional view of Figure 1 taken on the line 6—6.

Referring now to the details of the air pump 24 as shown in Figures 1, 1a, 2, 3, 5 and 6, it comprises a casing with the body 29 having inlet and outlet ports 31 and 32 and separated into inlet and outlet chambers 33 and 34 by means of a bridgewall 36 which has an aperture 37 surrounded by a seating surface 38. A large diaphragm 39 is compressibly interposed between the body 29 and the lower cover 41 by means of bolts 42. The diaphragm 39 and the cover 41 define an expandable driving chamber 43 which communicates with the outlet chamber 34 through the aperture 44 formed in the cover portion. A smaller diaphragm 46 is compressibly interposed between the body 29 and the cover 47 which, in this case, is mounted by means of the threads 48. The diaphragm 46 and cover 47 define an expandable suction chamber 49 which, on enlargement, can inspire atmospheric air through the "sniffer" or check valve 51 and on contraction can discharge the inspired air through the restricted passage or orifice 52 which communicates with the tank 21 to the air replenishing tube 26. The passage 52 is small enough to offer a comparatively high resistance to the rapid flow of water through it although air or other gas can move through the passage rapidly enough when the diaphragm 46 is moved downwardly to prevent a high degree of suction in the chamber 49. As shown in Fig. 5, the check valve 51 includes a rubber-like disk 53 and a spring 54 which normally holds the disk tightly against the screwed-in seat member 56. The spring 54 is strong enough to maintain the opening in the seat 56 closed when the diaphragm 46 is moved downwardly if, at the same time, there is a flow of air through the restricted passage 52 from the tank to the suction chamber 49. This occurs if the water level in the tank is below the connection 57 for the air discharge tube 26 and in such event the operation of the diaphragm 46 each time a faucet is opened merely serves to draw air from the tank to the suction chamber and then force the air back into the tank again without adding additional air from the outside. If, however, the liquid level in the tank is above the connection 57 it operates to add air to the tank; under these circumstances, this addition of the air occurs automatically because, when the diaphragm 46 is moved downward, air will be drawn into the suction chamber through the check valve 51 since the restriction offered by the passage 52 is too great for the rapid flow of water through that passage and consequently sufficient suction is developed to overcome the tension of the spring 54. This charge of air drawn into the chamber 49, together with whatever water leaks in slowly through the passage 52, will then be injected into the tank when flow through the service line 23 stops by means of the spring 58, as will be described.

The driving diaphragm 39, together with back-up plates 59 and 61, is mounted on the lower end of a shaft or rod 62 by a screw 63. The shaft 62 extends through the seat opening 37 and has mounted on its upper or opposite end the smaller diaphragm 46 and the back-up plates 63 and 64 by means of a screw 66. The two diaphragms are thus interconnected for simultaneous movement in response to pressure differential between the inlet and outlet ports 31 and 32. When the outlet pressure is lowered, as when a faucet (not shown) on the end of the service line 23 is opened, this lowered pressure will be communicated to the bottom of the driving diaphragm 39 through the aperture 44. Thus, the same pressure differential between the inlet and outlet ports will be operative across the upper and lower surfaces of the driving diaphragm to move the entire diaphragm assembly downward to inspire air into the suction chamber 49 through the check valve 51 or the orifice 52 depending on the location of the water level in the tank as above described. When the pressure between the inlet and outlet ports approaches a balanced condition as when all the outlets from the service pipe are closed to stop the flow therein the spring 58 will move the diaphragm assembly upwards to displace the inspired air into the tube 26.

An important feature of my invention which insures that no appreciable flow can occur through the device without positively inspiring air is illustrated by the downwardly facing shaft shoulder 67 and the annular disk 68, the latter having one side engageable with the shoulder 67 and the other engageable with the seat 38. This construction renders the device positive in action because every time a faucet is opened to draw liquid through the service line 23 the diaphragm assembly must be moved downwardly from the Figure 1 to Fig. 2 positions before the disk 68 begins to be displaced from the seat 38.

Considering now more specifically the operation of the air pump modification described above in connection with Figures 1–6, assume that there is no demand for water at any point of use and, therefore, there is no flow through the service line 23. The diaphragm assembly will have been moved to the Figure 1 position with the disk 68 seated in substantially fluid tight relation upon the seating surface 38 and the suction chamber 49 will have been reduced to its minimum size. Next, assume that a faucet is opened to demand water and in response to this demand the pressure at the outlet port 32 is lowered. This lowered pressure will be communicated through the aperture 44 to the bottom of the large diaphragm 39 which will be moved downwardly in response to the pressure differential carrying the diaphragm assembly from the Figure 1 to the Fig. 2 position. During this movement air will be inspired into the suction chamber either through the check valve 51 if the water level is above the tank connection 57 or through the orifice 52 if the water level is below 57. While the diaphragm assembly is being moved downwardly from the Figure 1 to Fig. 2 positions the disk 68 will be pressed upwardly against its seat by the pressure differential existing across it. The area of the disk 68 is relatively small compared with that of the large diaphragm 39 and the disk will be unseated by continued downward movement to the Fig. 3 position. Flow will then take place from the tank to the point of use through the service line. Subsequently, when flow is stopped the inlet and outlet pressures will equalize quickly to allow the spring 58 to return the assembly to the Figure 1 position. In so doing, it will discharge the previously inspired air into the tank.

While the modification described above employs diaphragms as the movable walls of the suction and driving chambers, one or both may be a piston or pistons, as shown in Figs. 7–9, and it will now be described with the parts which are similar or equivalent to parts in the diaphragm modification (Figures 1–6) being indicated by the same reference characters followed by the letter "a."

Referring first to Fig. 9, the piston modification generally designated 24a is shown installed in the service line 23a, the other parts being identical with those shown in Fig. 4. The normal flow of water is again indicated by the arrows "A" and that of make up air by the arrows "B."

The air pump 24a comprises a casing made up of an upper portion 69 and a lower portion 71 threadedly engaged at 72 and having interposed therebetween a sealing gasket 73. The lower portion 71 is formed with the inlet 31a and the outlet 32a at upper and lower ends, respectively, of the cylindrical bore 74 which engages a large or driving piston 39a. The upper casing portion 69 has a smaller cylindrical bore 76 in which a driven or suction piston 46a is engaged, the two pistons being interconnected into one assembly by the screws 63a and 66a and the shaft or rod 62a. The assembly is urged to the Fig. 7 or uppermost position by the spring 58a, which is positioned in the driving chamber 43a. The suction chamber 49a is provided with a check valve 51a and aperture 52a for the same purpose as already described in connection with the previous modification.

When the pressure in the outlet port is lowered, as when a faucet in the service line is opened, the high pressure in the inlet port 31a will move the assembly down against the compression of the spring 58a, creating a suction in the suction chamber 49a. Construction is such that the suction chamber will inspire practically a full charge of air before the outlet port 32a is uncovered to provide communication and establish flow between the inlet and outlet ports. When a positive charge of air has thus been inspired, there will be no further need of maintaining a low pressure in the suction chamber. In fact, to do so would be objectionable for it would subtract an area equal to that of the small piston from the area on the piston assembly upon which pressure would be effective to resist the compression of the spring 58a. The holes 77 are, therefore, provided in the skirted extension 78 of the cylinder wall 76 in a position where they will be uncovered by the small piston at the downward end of its stroke so that the high inlet pressure may be effective over the entire area of the large piston to hold it down when water is flowing freely through the casing. The apertures 77 constitute an important part of my invention since they are advantageous in lowering the pressure drop through the air pump and increasing the available pressure at the end of the service line.

It will thus be seen that the amount of air in the tank will be maintained substantially consistent without requiring the attention of an operator. Furthermore, since the device will operate to charge air into the tank each time water is drawn through the service line a very small and compact air pump structure may be provided for use with even the largest storage tanks. This is by way of contrast with previous air replenishing devices which were constructed to operate only each time the water pump was started and which, therefore, had to be made in a different size for each different storage tank size.

While only two particular embodiments of the present invention have been shown it will be apparent that many minor changes therein would readily suggest themselves to others skilled in the art without departing from the spirit and scope of the invention. Having thus described the invention, what is claimed as new is:

I claim:

1. The combination in a water supply system having a pressure storage tank and a service line of a casing having a first cylinder and an inlet port and an outlet port associated with opposite ends of said cylinder, said ports adapted to be connected into said service line, a piston in said first cylinder, said casing having an air chamber comprising a small cylinder axially aligned with the first-mentioned cylinder, a small piston reciprocably mounted in said small cylinder and connected to the first piston, said air chamber having an air outlet port adapted to communicate with said tank and having an air inlet, said inlet being open in response to sub-atmospheric pressures in the chamber and closed at all other times, said casing having apertured means effecting communication between said air chamber and said inlet port when said small piston is moved to one position, the pistons being dimensioned and positioned whereby said pistons are movable a predetermined amount in response to pressure differential existing between said inlet and outlet ports to draw a predetermined volume of air into said air chamber before liquid flows between said inlet and outlet ports followed by said first piston overrunning said outlet to permit flow of liquid from said inlet to said outlet followed by said small piston moving to a position to place said air chamber and said inlet in communication through said apertured means to admit high pressure liquid to the top of said small piston.

2. In a pressure responsive device, the combination of a casing having a cylinder, an inlet port connected to a pressure fluid source and an outlet port connected to a service line, a check valve mounted on said casing and disposed between said cylinder and atmosphere, and an exhaust port in communication with said cylinder, a reciprocable member having a piston disposed in said cylinder and movable from a first to a second position to draw air into said cylinder through said check valve and back to its first position to force the air through the exhaust port, said reciprocable member including means disposed in said casing responsive to a pressure differential existing between said inlet and outlet ports for moving the reciprocable member from its first poistion to its second position; means providing communication between said inlet port and said cylinder after a predetermined movement of said piston whereby pressure fluid enters said cylinder to react on said piston to aid in urging the reciprocable member to its second position, and means for urging said reciprocable member to its first poistion when the pressures at the inlet and outlet ports are equal.

3. In a pressure responsive device, the combination of a casing having a chamber shaped to define a first cylinder and a second cylinder in axial alignment with the first cylinder, an inlet port for connection with a pressure fluid source, an exhaust port for connection with a service line, a check valve disposed between said first cylinder and atmosphere, and an air exhaust port in communication with said first cylinder, a reciprocable member disposed in said first cylinder and movable between preselected positions, said member having a first piston disposed in said first cylinder to draw air into one end of said first cylinder through said check valve as it moves from a first to a second position and to force air out through the air exhaust port as it moves back to its first position and a second piston disposed in said second cylinder and positioned to be reacted on by the pressure fluid at the inlet port when a pressure differential exists between said inlet and outlet ports to move the reciprocable member from said first position to said second position, resilient means for urging said reciprocable member to its first position when the pressures at the inlet and outlet ports are substantially equal, and a sleeve-like projection in said chamber spaced inwardly of the inlet port and shaped to define a skirted extension of the first cylinder, said skirted extension having at least one passageway positioned to effect communication between the inlet port and the first cylinder when the piston is in said second position whereby the fluid pressure is effective on the maximum cross-sectional area of said piston to aid in maintaining the piston in said second position and positioned to prevent the entrance of fluid to the first cylinder to be effective on said piston as described above when said member is in said first position.

ELMER M. DETERS.

REFERENCES CITED

The following references are of record in the file of this patent:

UNITED STATES PATENTS

| Number | Name | Date |
|---|---|---|
| 1,898,337 | Brooks | Feb. 21, 1933 |
| 2,416,345 | Piccardo | Feb. 25, 1947 |
| 2,447,173 | Gordon | Aug. 17, 1948 |